(12) United States Patent
Kim (10) Patent No.: US 9,190,636 B2
(45) Date of Patent: Nov. 17, 2015

(54) RECHARGEABLE BATTERY

(71) Applicants: SAMSUNG SDI CO., LTD., Yongin-si, Gyeonggi-do (KR); ROBERT BOSCH GMBH, Stuttgart (DE)

(72) Inventor: Dukjung Kim, Yongin-si (KR)

(73) Assignees: SAMSUNG SDI CO., LTD., Yongin-si, Gyeonggi-Do (KR); ROBERT BOSCH GmbH, Stuttgart (DE)

( * ) Notice: Subject to any disclaimer, the term of this patent is extended or adjusted under 35 U.S.C. 154(b) by 186 days.

(21) Appl. No.: 13/759,262

(22) Filed: Feb. 5, 2013

(65) Prior Publication Data

US 2013/0337295 A1    Dec. 19, 2013

(30) Foreign Application Priority Data

Jun. 15, 2012  (KR) .................. 10-2012-0064372

(51) Int. Cl.
| | |
|---|---|
| H01M 2/00 | (2006.01) |
| H01M 2/06 | (2006.01) |
| H01M 2/26 | (2006.01) |
| H01M 2/30 | (2006.01) |
| H01M 2/34 | (2006.01) |

(52) U.S. Cl.
CPC ................ *H01M 2/06* (2013.01); *H01M 2/266* (2013.01); *H01M 2/30* (2013.01); *H01M 2/345* (2013.01)

(58) Field of Classification Search
CPC ................... H01M 2/06; H01M 2/345
USPC .................................... 429/57, 179
See application file for complete search history.

(56) References Cited

U.S. PATENT DOCUMENTS

| | | | |
|---|---|---|---|
| 2001/0051298 A1* | 12/2001 | Hanafusa et al. | 429/162 |
| 2013/0136961 A1* | 5/2013 | Han et al. | 429/61 |

FOREIGN PATENT DOCUMENTS

| | | |
|---|---|---|
| JP | 05-006400 A | 1/1983 |
| KR | 1998-041990 U | 9/1998 |
| KR | 2000-0051448 A | 8/2000 |

\* cited by examiner

*Primary Examiner* — Cynthia H Kelly
*Assistant Examiner* — Monique Wills
(74) *Attorney, Agent, or Firm* — Lee & Morse, P.C.

(57) ABSTRACT

A rechargeable battery, including an electrode assembly having a first electrode plate, a second electrode plate, and a separator, a first terminal electrically connected to the first electrode plate, a case accommodating the electrode assembly and the first terminal, and a cap assembly sealing the case. The first terminal includes a first collector plate in the case electrically connected to the first electrode plate of the electrode assembly, a first electrode terminal exposed to a top surface of the cap assembly, the first electrode terminal having a first terminal hole passing through a top and bottom surface of the first electrode terminal, and a first connection terminal having a first side electrically connected to the first electrode terminal and a second side electrically connected to the first collector plate, the first connection terminal having a first fuse hole at the first side.

20 Claims, 6 Drawing Sheets

RECHARGEABLE BATTERY

CROSS-REFERENCE TO RELATED APPLICATION

This application claims priority under 35 U.S.C. §119 to Korean Patent Application No. 10-2012-0064372, filed on Jun. 15, 2012, in the Korean Intellectual Property Office, and entitled: "RECHARGEABLE BATTERY," the entirety of which is hereby incorporated by reference.

BACKGROUND

1. Field

Embodiments relate to a rechargeable battery.

2. Description of the Related Art

Low capacity rechargeable batteries may be composed of a single cell, and may be used for portable small electronic devices, such as mobile phones, and camcorders. Large capacity rechargeable batteries may be composed of a plurality of cells connected in the form of a pack, and may be used drive motors of hybrid electric vehicles.

SUMMARY

Embodiments are directed to a rechargeable battery, including an electrode assembly having a first electrode plate, a second electrode plate, and a separator, a first terminal electrically connected to the first electrode plate, a case accommodating the electrode assembly and the first terminal, and a cap assembly sealing the case, wherein the first terminal includes a first collector plate electrically connected to the first electrode plate of the electrode assembly and accommodated in the case, a first electrode terminal exposed to a top surface of the cap assembly, the first electrode terminal having a first terminal hole passing through a top surface and a bottom surface of the first electrode terminal, and a first connection terminal having a first side electrically connected to the first electrode terminal and a second side electrically connected to the first collector plate, the first connection terminal having a first fuse hole at the first side.

The first side of the first connection terminal having the first fuse hole may be mounted within the first terminal hole.

The first connection terminal may have a shape of a cylinder or a polygonal pillar with a shape of a circular or a polygonal ring in a horizontal section.

The first connection terminal may have a blocking plate with a shape of a pillar, and the blocking plate may block an internal hole passing through top and bottom surfaces of the first connection terminal.

The first connection terminal may include a first flange outwardly bent and extending from the first side of the first connection terminal, the first flange may have a shape of a polygon or a circle in a horizontal section, a second flange outwardly bent and extending from the second side of the first connection terminal, the second flange may have a shape of a polygon or a circle in a horizontal section, and a body part connecting the first flange and the second flange.

The second side of the first connection terminal may be mounted in a first connection hole in the first collector plate.

The blocking plate may be positioned above the second flange and below the first fuse hole.

The first electrode terminal may have a ring shape with the terminal hole passing through the top and bottom surfaces thereof, and a top end perimeter of the terminal hole may be greater than a bottom end perimeter of the terminal hole.

The first electrode terminal may further include a first terminal protrusion part horizontally protruding from a lower portion of the first electrode terminal.

The first flange may contact a top surface of the first terminal protrusion part and may be fixed thereto.

The first collector plate may have a first region electrically connected to the first electrode plate, and a second region that is bent and extends from the first region and is electrically connected to the first connection terminal mounted in the first connection hole.

The second region of the first collector plate may be parallel with the cap assembly.

The first connection hole may pass through top and bottom surfaces of the second region of the first collector plate, and a top end perimeter of the first connection hole may be smaller than a bottom end perimeter of the first connection hole.

The second region of the first collector plate may further include a first collector plate protrusion part horizontally protruding from an upper portion of the second region of the first collector plate.

The second flange may contact a bottom surface of the first collector plate protrusion part and may be fixed thereto.

The first fuse hole may be on a side of the body part connected to the first flange.

The first fuse hole may include at least two first fuse holes spaced a predetermined distance apart from each other in a horizontal direction.

The cap assembly may include a cap plate sealing the case, and a vent plate in the cap plate, the vent plate being openable when an internal pressure of the case exceeds a preset pressure.

The rechargeable battery may further include a second terminal electrically connected to the second electrode plate, a first short-circuit plate in a short-circuit hole in the cap plate and electrically connected to the cap plate, the first short-circuit plate may form an upward convex protrusion when the internal pressure of the case exceeds a predetermined pressure, and a second short-circuit plate upwardly spaced apart from the first short-circuit plate and electrically connected to the second terminal.

The first side of the first connection terminal may include a fuse region, the fuse region may be meltable to form a gas discharge path when an applied current reaches a predetermined amount, and the gas discharge path may allow gas within the case to discharge to outside of the case through the first terminal hole.

BRIEF DESCRIPTION OF THE DRAWINGS

Features will become apparent to those of skill in the art by describing in detail exemplary embodiments with reference to the attached drawings in which.

DETAILED DESCRIPTION

Example embodiments will now be described more fully hereinafter with reference to the accompanying drawings;

however, they may be embodied in different forms and should not be construed as limited to the embodiments set forth herein. Rather, these embodiments are provided so that this disclosure will be thorough and complete, and will fully convey exemplary implementations to those skilled in the art.

In the drawing figures, the dimensions of layers and regions may be exaggerated for clarity of illustration. It will also be understood that when a layer or element is referred to as being "on" another layer or element, it can be directly on the other layer or element, or intervening layers or elements may also be present. Further, it will be understood that when a layer or element is referred to as being "under" another layer or element, it can be directly under, and one or more intervening layers or elements may also be present. In addition, it will also be understood that when a layer or element is referred to as being "between" two layers or elements, it can be the only layer or element between the two layers or elements, or one or more intervening layers or elements may also be present. Like reference numerals refer to like elements throughout.

Figure 1A:
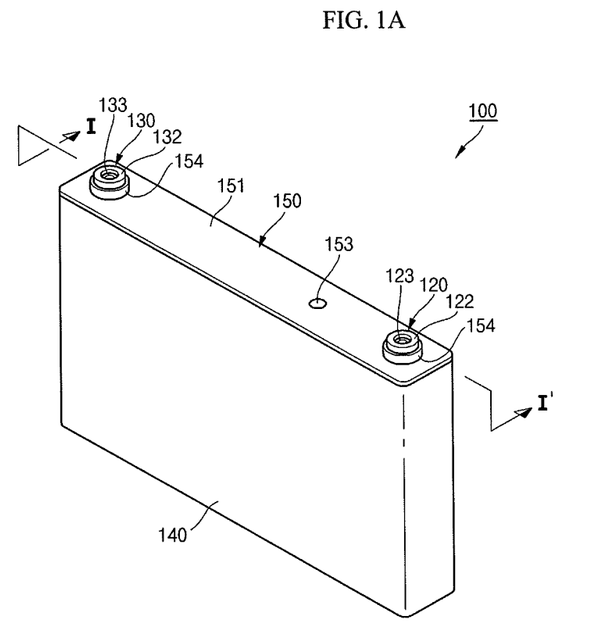
FIG. 1A illustrates a perspective view of a rechargeable battery according to an embodiment.
Figure 1B:
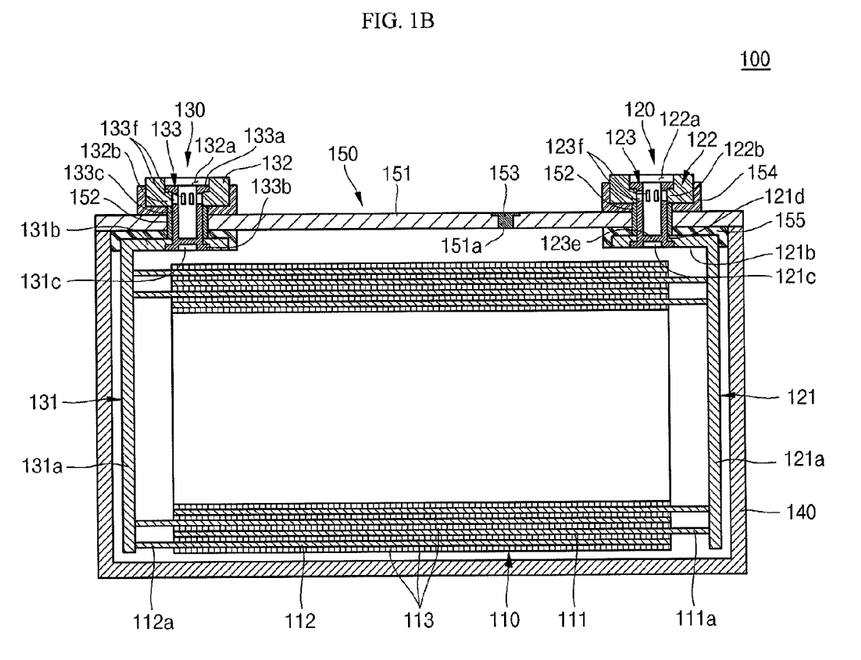
FIG. 1B illustrates a cross-sectional view taken along the line I-I' of FIG. 1A.

FIG. 1A illustrates a perspective view of a rechargeable battery according to an embodiment, and FIG. 1B is a cross-sectional view taken along the line I-I' of FIG. 1A.

As shown in FIGS. 1A and 1B, the rechargeable battery 100 according to an embodiment may include an electrode assembly 110, a first terminal 120, a second terminal 130, a case 140, and a cap assembly 150.

The electrode assembly 110 may be formed by winding or laminating a stacked structure including a first electrode plate 111, a separator 113, and a second electrode plate 112, which may be formed of thin plates or layers. The first electrode plate 111 may serve as a positive electrode and the second electrode plate 112 may serve as a negative electrode, or vice versa.

The first electrode plate 111 may be formed by coating a first electrode active material, e.g., a transition metal oxide, on a first electrode current collector made of a metallic foil, e.g., an aluminum foil, and may include a first electrode non-coating portion 111a that is not coated with the first active material. The first electrode non-coating portion 111a may provide a path of the current flow between the first electrode plate 111 and external portions of the battery. The present embodiments are not limited by the material of the first electrode plate 111.

The second electrode plate 112 may be formed by coating a second electrode active material, e.g., graphite or carbon, on a second electrode current collector made of a metallic foil, e.g., a copper or nickel foil, and may include a second electrode non-coating portion 112a that is not coated with the second active material. The second electrode non-coating portion 112a may provide a path of the current flow between the second electrode plate 112 and external portions of the battery. The present embodiments are not limited by the material of the second electrode plate 112.

The separator 113, located between the first electrode plate 111 and the second electrode plate 112, may interrupt an electric short therebetween, and may enable movement of lithium ions. The separator 113 may be formed of a porous membrane using, e.g., polyethylene (PE), polypropylene (PP), or their composite film. The present embodiments are not limited by the material of the separator 113.

A first terminal 120 and a second terminal 130 may be electrically connected to the first electrode plate 111 and the second electrode plate 112, and may be coupled to opposite ends of the electrode assembly 110.

The electrode assembly 110 may be substantially accommodated in the case 140 with an electrolyte. The electrolyte may include an organic solvent, such as, e.g., ethylene carbonate (EC), propylene carbonate (PC), diethyl carbonate (DEC), ethyl methyl carbonate (EMC), or dimethyl carbonate (DMC), and a lithium salt, such as, e.g., $LiPF_6$ or $LiBF_4$. In addition, the electrolyte may be in a liquid, solid or gel phase. The present embodiments are not limited by the material of the electrolyte.

The first terminal 120 may be made of a metal or the like, and may be electrically connected to the first electrode plate 111. The first terminal 120 may include a first collector plate 121, a first electrode terminal 122, and a first connection terminal 123.

The first collector plate 121 may make contact with the first electrode non-coating portion 111a protruding to one end of the electrode assembly 110. The first collector plate 121 may be welded to the first electrode non-coating portion 111a. The first collector plate 121 may be formed in a substantially L shape and may include a first connection hole 121c formed thereon. The first connection terminal 123 may be inserted into and coupled to the first connection hole 121c. The first collector plate 121 may be made of, e.g., aluminum or an aluminum alloy, but the present embodiments are not limited by the material of the first collector plate 121.

In more detail, the first collector plate 121 may include a first region 121a and a second region 121b. The first region 121a may be welded to the first electrode non-coating portion 111a of the electrode assembly 110 and may be vertically disposed. The second region 121b may be bent at a top end of the first region 121a at a substantially right angle and may extend a predetermined length to be parallel with a cap plate 151 (described later in greater detail), so that the second region 121b may be generally disposed to face upward in a substantially horizontal direction.

In addition, the first connection hole 121c may pass through top and bottom surfaces of the second region 121b, and may be formed in the second region 121b for coupling to the first connection terminal 123. The first connection hole 121c may be sized to correspond to the first connection terminal 123 so as to allow the first connection terminal 123 to be mounted therein. A top end perimeter of the first connection hole 121c may be smaller than a bottom end perimeter of the first connection hole 121c, and thus may have an inner surface having a step difference.

In addition, a first collector plate protrusion part 121d horizontally protruding from an upper portion of the first collector plate 121 may be formed in the second region 121b. That is, the first connection hole 121c may be formed to have a step difference in its inner surface by the first collector plate protrusion part 121d, and thus a top end of the first connection hole 121c may be smaller than a bottom end of the first connection hole 121c. A top surface of the first collector plate protrusion part 121d may be coplanar with a top surface of the second region 121b. A bottom surface of the first collector plate protrusion part 121d may make contact with a second flange 123b of the first connection terminal 123, and the first connection terminal 123 may be mounted in the first connection hole 121c and may be fixed to the first collector plate 121 by the second flange 123b.

The first electrode terminal 122 may be electrically connected to the first connection terminal 123 protruding to an upper portion of the cap plate 151 (to be described later in greater detail). The first electrode terminal 122 may have a ring shape by a first terminal hole 122a passing through the top and bottom surfaces of the first electrode terminal 122. The first terminal hole 122a of the first electrode terminal 122 may be sized and shaped to correspond to the first connection terminal 123 in a horizontal direction. A top end perimeter of the first terminal hole 122a may be greater than a bottom end perimeter of the first terminal hole 122a, and thus the inner surface of the first electrode terminal 122 may be formed to have a step difference.

In addition, a first terminal protrusion part 122b may horizontally protrude from a bottom portion of the first electrode terminal 122. That is, the first terminal hole 122a may be formed to have a step difference in its inner surface by the first terminal protrusion part 122b, and thus a top end of the first terminal hole 122a may be larger than a bottom end of the first terminal hole 122a. A bottom surface of the first terminal protrusion part 122b may be coplanar with a bottom surface of the first electrode terminal 122. A top surface of the first terminal protrusion part 122b may make contact with a first flange 123a of the first connection terminal 123 (to be described later in greater detail). That is, the first electrode terminal 122 may accommodate a first side of the first connection terminal 123 having the first flange 123 through the first terminal hole 122a, and may fix the first connection terminal 123 mounted in the first terminal hole 122a through the first terminal protrusion part 122b and the first flange 123a.

The first electrode terminal 122 may be made of, e.g., aluminum, an aluminum alloy or the like, but the present embodiments are not limited by the material of the first electrode terminal 122.

The first connection terminal 123 may have a first side extending and upwardly protruding a predetermined length while passing through the cap plate 151 (to be later described in greater detail), and a second side electrically connected to the first collector plate 121 below the cap plate 151. The first side of the first connection terminal 123 extending to an upper portion of the cap plate 151 may be mounted in the first terminal hole 122a of the first electrode terminal 122.

The first connection terminal 123 will now be described in more detail with reference to FIGS. 1A, 1B and 2.

Figure 2:
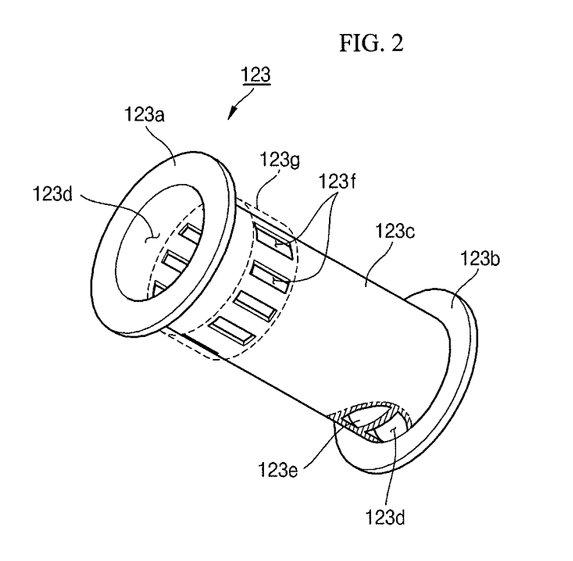
FIG. 2 illustrates an enlarged perspective view of a first connection terminal shown in FIG. 1A, according to an embodiment.

As shown in FIG. 2, which illustrates an enlarged perspective view of the first connection terminal 123, the first connection terminal 123 may be have the shape of a cylinder having a horizontal section with a circular ring shape. The first connection terminal 123 may have the first flange 123a and the second flange 123b bent from its first side and second side to exterior sides of the horizontal section, and a body part 123c connecting the first flange 123a and the second flange 123b. As illustrated through the partial cut-away view (which is for illustrative purposes only) of the lower portion of the first connection terminal 123 in FIG. 2, the first connection terminal 123 may also include a blocking plate 123e. The first connection terminal 123 may have a shape of a polygonal pillar having a horizontal section with a polygonal ring shape.

The first flange 123a may be outwardly bent at an end of the body part 123c to the exterior side of the horizontal section. The first flange 123a may be formed by, e.g., mounting the first connection terminal 123 shaped of a cylinder in the first terminal hole 122a of the first electrode terminal 122 and riveting the first side thereof. That is, the first flange 123a may be outwardly bent from the body part 123c by riveting, and thus it may be compressed on the first terminal protrusion part 122b of the first terminal hole 122a. The first flange 123a may make contact with the first terminal protrusion part 122b and may be fixed thereto, and thus the first connection terminal 123 may be mounted in the first terminal hole 122a, and may be substantially prevented from escaping toward the body part 123c.

The second flange 123b may be bent at the other end of the body part 123c to the exterior side of the horizontal section. The second flange 123b may be formed by, e.g., mounting the first connection terminal 123 shaped of a cylinder in the first connection hole 121c of the first collector plate 121 and riveting the second side thereof. That is, the second flange 123b may be outwardly bent from the body part 123c by riveting, and thus is may be compressed on the first collector plate protrusion part 121d of the first connection hole 121c. The second flange 123b may make contact with the first collector plate protrusion part 121d and may be fixed thereto, and thus the first connection terminal 123 may be mounted in the first connection hole 121c, and may be substantially prevented from escaping toward the body part 123c.

The body part 123c may have the shape of a cylinder having a horizontal section with a circular ring shape. The body part 123c may be integrally formed with the first flange 123a bent from the first end thereof to the exterior side of the horizontal section. In addition, the body part 123c may be integrally formed with the second flange 123b bent from the second end (opposite to the first end) thereof to the exterior side of the horizontal section.

The body part 123c may have the shape of a cylinder and may include an internal hole 123d passing through top and bottom surfaces of the cylinder, and a blocking plate 123e blocking the internal hole 123d passing through the top and bottom surfaces of the body part 123c. That is, the internal hole 123d disposed in the body part 123c may be formed to extend from the top surface of the first end of the body part 123c to a top surface of the blocking plate 123e, and may be formed about the blocking plate 123e to extend from the bottom surface of the second end of the body part 123c to the bottom surface of the blocking plate 123e. The blocking plate 123e may be formed inside of the second side (e.g., the lower side) of the body part 123c to seal the inside of the ring-shaped body part 123c in a horizontal direction.

The blocking plate 123e may be integrally formed with the body part 123c. The blocking plate 123e may be formed between a first fuse hole 123f (to later be described in greater detail) and the second flange 123b. The blocking plate 123e may be formed to seal the inside of the rechargeable battery 100. The top surface of the blocking plate 123e may be exposed to the outside through the internal hole 123d, and the bottom surface of the blocking plate 123e may contact an electrolyte accommodated within the case 140.

The body part 123c may have a first fuse hole 123f formed at its first side connected to the first flange 123a. Preferably, the first fuse hole 123f may be formed to pass through a side surface of the cylindrical body part 123c. The first fuse hole 123f may include at least two first fuse holes formed in the body part 123c to be spaced a predetermined distance apart from each other in a horizontal direction. The first fuse hole 123f may be formed between the blocking plate 123e and the first flange 123a. The first fuse hole 123f may have a suitable shape, e.g., the shape of an vertically elongated rectangle.

A region horizontally spaced apart from the first fuse hole 123f may be a fuse region 123g. A cross sectional area of the fuse region 123g having the first fuse hole 123f may be smaller than a cross sectional area of another region of the first connection terminal 123. When a large amount of current flows (e.g., due to an electric short of the rechargeable battery 100), the fuse region 123g having the first fuse hole 123f may be melted to function as a fuse that blocks the flow of current.

The first fuse hole 123f of the body part 123c may be mounted in the first terminal hole 122a of the first electrode terminal 122. In this way, if the first fuse hole 123f of the body part 123c is accommodated in the first electrode terminal 122 and fixed by the first flange 122b, the first electrode terminal 122 may lessen or absorb an external shock, and thus may suppress the fuse region 123g having the first fuse hole 123f from being damaged due to the external shock and ultimately improving durability and safety.

In addition, if the first fuse hole 123f is positioned outside the case 140, the first connection terminal 123 may substantially prevent gases from being generated from the electrolyte due to an arc when the fuse region 123g formed in the collector plate 121 of the first terminal 120 is melted in order to implement a fuse function.

Figure 3:
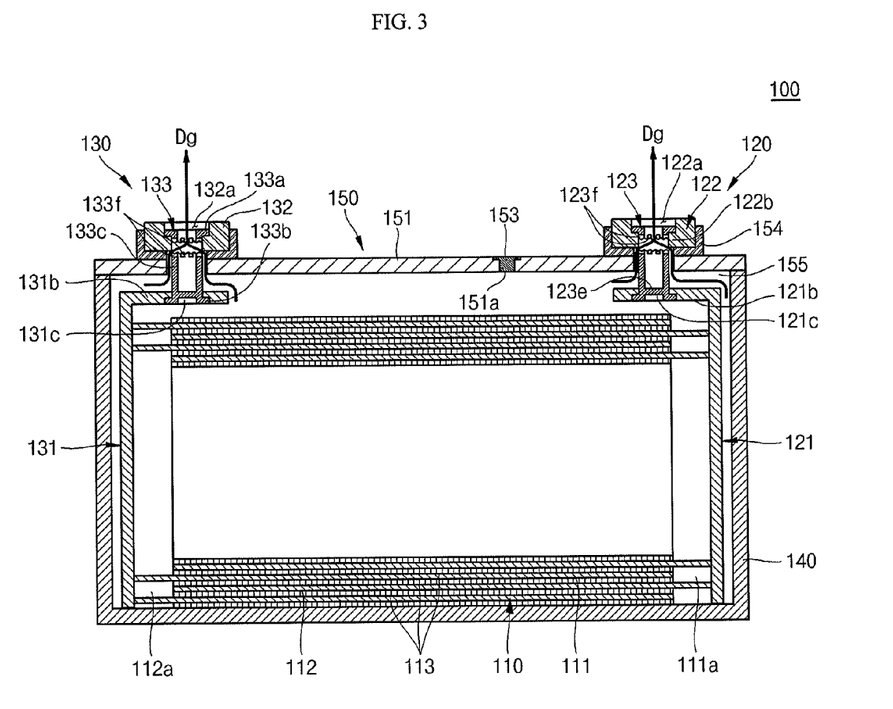
FIG. 3 illustrates a cross-sectional view of a fuse function of the rechargeable battery shown in FIG. 1B, according to an embodiment.

In addition, when the fuse region 123g having the first fuse hole 123f is short-circuited due to an external shock or an electric short, as illustrated in FIG. 3, the first collector plate 121 and the electrode assembly 110 may be lowered to be positioned below the case 140, so that the first connection terminal 123 may form a gas discharge path Dg for discharging the internal gas of the case 140 to the outside of the case 140. A seal gasket (not shown) and a lower insulator (not shown), which may be disposed within the case 140 to implement an insulating function, may be separated and lowered to the lower portion of the case 140. The gas discharge path Dg may be formed when a side portion of the internal hole 123d corresponding to the fuse region 123g is opened due to an electric short of the fuse region 123g of the first connection terminal 123.

The second terminal 130 may be made of a metal or an equivalent thereof and may be electrically connected to the second electrode plate 112. The second terminal 130 may include a second collector plate 131, a second electrode terminal 132, and a second connection terminal 133. The second terminal 130 may have substantially the same configuration as that of the first terminal 120, (except that a separate fuse hole may not be provided in the second connection terminal 133 of the second terminal 130), and a detailed description thereof will not be repeated.

The first region 131a of the second collector plate 131 may be electrically connected to the second electrode non-coating portion 112a of the electrode assembly 110, and the second region 131b thereof may be electrically connected to the second connection terminal 133. In addition, the second connection terminal 133 may have a first flange 133a and a second flange 133b bent from the first side and the second side of the second connection terminal 133 to exterior sides of the horizontal section, and a body part 133c connecting the first flange 133a and the second flange 133b. The second connection terminal 133 may have a first side extending and upwardly protruding a predetermined length while passing through the cap plate 151 (to be later described in greater detail), and a second side electrically connected to the second collector plate 131 below the cap plate 151. The second side of the second connection terminal 133 may be mounted in a first connection hole 131c formed in the second collector plate 131 and may be fixed by the second flange 133b. The first side of the second connection terminal 133 extending to an upper portion of the cap plate 151 may be mounted in a first terminal hole 132a of the second electrode terminal 132 and may be fixed by the first flange 133a. In addition, the second connection terminal 133 may have a polygonal pillar shape having a horizontal section with a polygonal ring shape, or a circular shape having a horizontal section with a circular ring shape.

In addition, the second collector plate 131, the second electrode terminal 132, and the second connection terminal 133 may be made of, e.g., copper, a copper alloy or the like, but the present embodiments are not limited by the materials of the second collector plate 131, the second electrode terminal 132, and the second connection terminal 133 thereto.

The case 140 may be made of a conductive metal such as, e.g., aluminum, an aluminum alloy or nickel plated steel, and may substantially have the shape of a hexahedron having an opening into which the electrode assembly 110, the first collector plate 121 of the first terminal 120, and the second collector plate 131 of the second terminal 130 may be inserted and placed. While FIG. 1B shows the case 140 and the cap assembly 150 in an assembled state and the opening is not shown, a peripheral portion of the cap assembly 150 may be in a substantially opened portion of the case 140. Meanwhile, if the inner surface of the case 140 is insulated, the case 140 may be insulated from the electrode assembly 110, the first terminal 120, the second terminal 130, and the cap assembly 150.

The cap assembly 150 may be coupled to the case 140. In detail, the cap assembly 150 may include a cap plate 151, a seal gasket 152, a plug 153, an upper insulation member 154, and a lower insulation member 155. The seal gasket 152, the upper insulation member 154, and the lower insulation member 155 may be functional elements of the first terminal 120 and the second terminal 130.

The cap plate 151 may seal the opening of the case 140 and may be made of the same material as the case 140. As an example, the cap plate 151 may be coupled to the case 140 by laser welding. If the cap plate 151 is electrically connected to the first terminal 120, the cap plate 151 and the case 140 may have the same polarity.

The seal gasket 152 may be formed to surround the first connection terminal 123 passing through the cap plate 151 and the second connection terminal 133 using an insulating material. That is, the seal gasket 152 may seal portions between each of the first connection terminal 123 and the second connection terminal 133, and the cap plate 151. The seal gasket 152 may substantially prevent external moisture from penetrating into the rechargeable battery 100 and/or may substantially prevent an electrolyte accommodated in the rechargeable battery 100 from flowing outside.

The plug 153 may seal an electrolyte injection hole 151a of the cap plate 151.

The upper insulation member 154 may be formed between each of the first electrode terminal 122 and the second electrode terminal 132, and the cap plate 151. In addition, the upper insulation member 154 may make close contact (e.g., direct contact) with the cap plate 151. Further, the upper insulation member 154 may also make close contact (e.g., direct contact) with the seal gasket 152. In addition, the upper insulation member 154 may be formed on the side surfaces of the first electrode terminal 122 and the second electrode terminal 132. The upper insulation member 154 may electrically insulate each of the first electrode terminal 122, the second electrode terminal 132, and the cap plate 151.

The lower insulation member 155 may be formed between each of the first collector plate 121 and the second collector plate 131, and the cap plate 151, and thereby may substantially prevent an unnecessary electric short. That is, the lower insulation member 155 may substantially prevent an electric short between the first collector plate 121 and the cap plate 151, and an electric short between the second collector plate 131 and the cap plate 151.

In addition, in the rechargeable battery 100 according to an embodiment, the first fuse hole 123f and the second fuse hole 133f may be accommodated inside the electrode terminals 122 and 132, respectively, thereby a fuse short due to movement of the electrode assembly 110 by an external shock may be substantially prevented, and durability may be ultimately improved. Thus, a region of the first fuse hole 123f or the second fuse hole 133f may be substantially prevented from being damaged, thereby substantially preventing a fuse function from degrading and ultimately improving safety.

In addition, in the rechargeable battery 100 according to an embodiment, if the first fuse hole 123f and the second fuse hole 133f are positioned outside the case 140, gases may be substantially prevented from being generated from the electrolyte due to an arc when a fuse region formed in the case 140 is melted in order to implement a fuse function.

In addition, in the rechargeable battery 100 according to an embodiment, if fuse regions having the first fuse hole 123f and the second fuse hole 133f are melted, a gas discharge path may be formed to discharge the internal gas of the case 140 to the outside through the internal holes formed in first connection terminal 123 and the second connection terminal 133, thereby facilitating gas discharge.

Figure 4A:
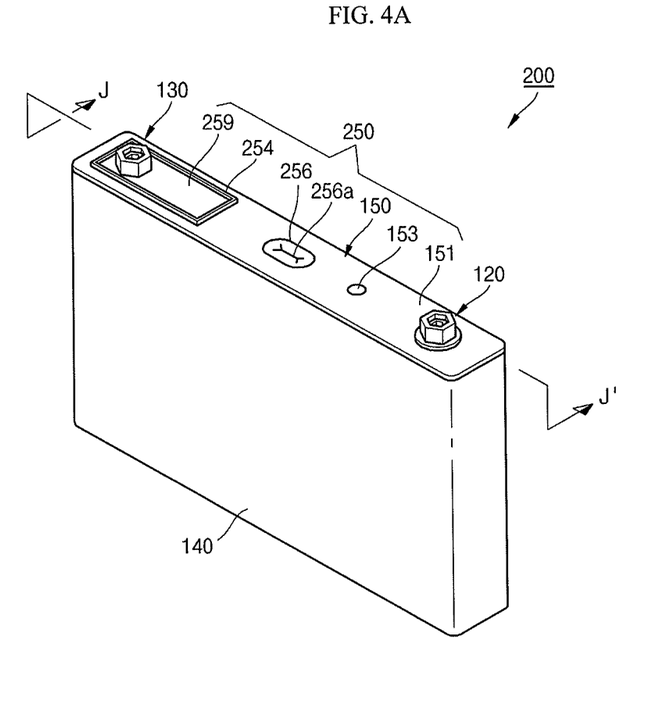
FIG. 4A illustrates a perspective view of a rechargeable battery according to an embodiment.
Figure 4B:
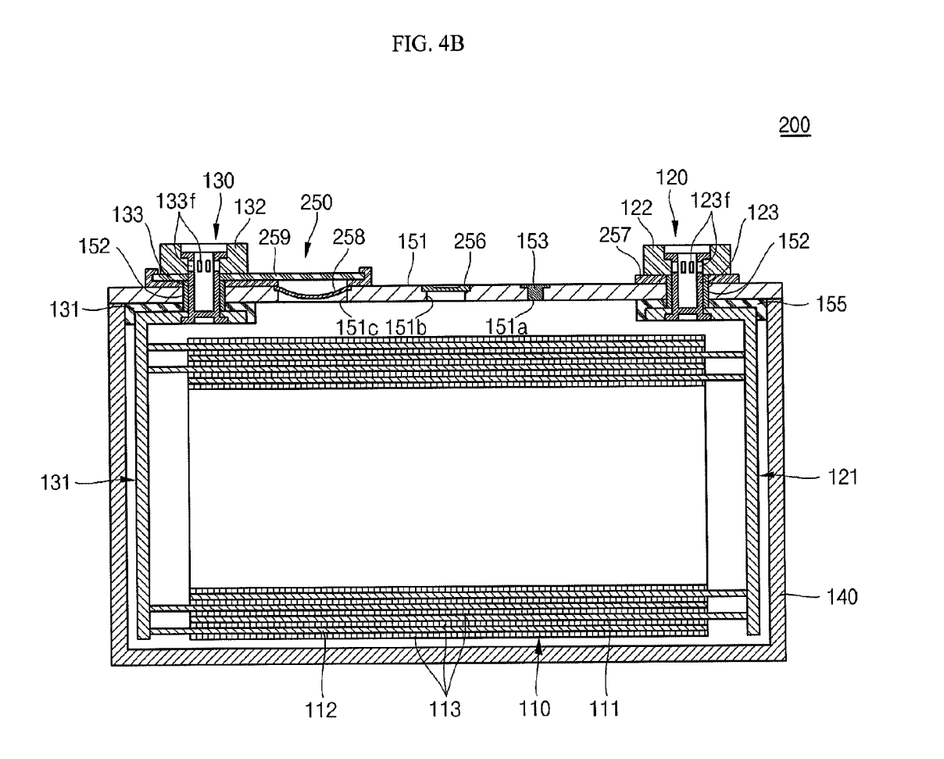
FIG. 4B illustrates a cross-sectional view taken along the line J-J' of FIG. 4A.

FIG. 4A illustrates a perspective view of a rechargeable battery according to an embodiment, and FIG. 4B illustrates a cross-sectional view taken along the line J-Y of FIG. 4A.

As shown in FIGS. 4A and 4B, an electrode assembly 110, a first terminal 120, a second terminal 130, and a case 140 of the rechargeable battery 200 may be substantially the same as those of the rechargeable battery 100 shown in FIGS. 1A and 1B. Thus, the following description of the rechargeable battery 200 will focus on a cap assembly 250, which may be different from the cap assembly 150 of the rechargeable battery 100. While FIGS. 4A and 4B illustrate horizontal sections of the first terminal 120 and the second terminal 120 as having a polygonal ring shape, the embodiment is not limited to these shapes of the horizontal sections of the first terminal 120 and the second terminal 120. The horizontal sections of the first terminal 120 and the second terminal 120 may have circular ring shape, as shown FIGS. 1A and 1B.

The cap assembly 250 of the rechargeable battery 200 may include a cap plate 151, a seal gasket 152, a plug 153, an upper insulation member 254, a lower insulation member 155, a vent plate 256, a connection plate 257, a first short-circuit plate 258, and a second short-circuit plate 259.

The cap plate 151 may seal the opening of the case 140 and may be made of the same material as the case 140. As an example, the cap plate 151 may be coupled to the case 140 by laser welding. If the cap plate 151 is electrically connected to the first terminal 120 through the connection plate 257 (to later be described in greater detail), the cap plate 151 and the first terminal 120 may have the same polarity. Accordingly, the cap plate 151 and the case 140 may have the same polarity.

The seal gasket 152 may be formed to surround the first connection terminal 123 passing through the cap plate 151 and the second connection terminal 133 using an insulating material. That is, the seal gasket 152 may seal portions between each of the first connection terminal 123 and the second connection terminal 133, and the cap plate 151. The seal gasket 152 may substantially prevent external moisture from penetrating into the rechargeable battery 200 and/or substantially prevent an electrolyte accommodated in the rechargeable battery 100 from flowing outside.

The plug 153 may seal an electrolyte injection hole 151a of the cap plate 151.

The upper insulation member 254 may be formed between the second electrode terminal 133 and the cap plate 151, and may make close contact (e.g., direct contact) with the cap plate 151. Further, the upper insulation member 254 may also make close contact (e.g., direct contact) with the seal gasket 152. In addition, the upper insulation member 254 may be formed between the second short-circuit plate 259 and the cap plate 151, and may electrically insulate the second short-circuit plate 259 and the cap plate 151.

The lower insulation member 155 may be formed between each of the first collector plate 121 and the second collector plate 131, and the cap plate 151, thereby may substantially prevent an unnecessary electric short. That is, the lower insulation member 155 may substantially prevent an electric short between the first collector plate 121 and the cap plate 151, and an electric short between the second collector plate 131 and the cap plate 151.

The vent plate 256 may be installed in a vent hole 151b of the cap plate 151, and a notch 256a may be formed in the vent plate 256 to be opened at a predetermined pressure.

The connection plate 257 may be formed between the cap plate 151 and the first electrode terminal 122, and may make close contact (e.g., direct contact) with the cap plate 151 and the seal gasket 152. The connection plate 257 may electrically connect the first electrode terminal 122 and the cap plate 151 to each other.

The first short-circuit plate 258 may be disposed in a short-circuit hole 151c of the cap plate 151 between the upper insulation member 254 and the cap plate 151.

The first short-circuit plate 258 may be formed of an inversion plate having a downwardly convex round part and an edge part fixed to the cap plate 151. When the internal pressure of the rechargeable battery 200 exceeds a preset pressure due to an overcharge, the first short-circuit plate 258 may be inverted and may protrude upwardly (e.g., as an upwardly convexly part). If the first short-circuit plate 258 protrudes upwardly, the first short-circuit plate 258 may be electrically connected to the cap plate 151, and thus the first short-circuit plate 258 and the cap plate 151 have the same polarity.

The second short-circuit plate 259 may be formed at an exterior side of the cap plate 151, and may be spaced apart from the cap plate 151, that is, above the upper insulation member 254, so as to allow the second connection terminal 133 to be inserted thereto, and may extend to cover the short-circuit hole 151c. The second short-circuit plate 259 may be electrically connected to the second terminal 130. If the internal pressure of the rechargeable battery 200 exceeds a preset pressure due to an overcharge, the second short-circuit plate 259 may make contact with the upwardly protruding first short-circuit plate 258, and thus may causing an electric short. In this case, a large amount of current may flow, and thus heat may be generated. At this time, the first fuse hole 123f or the second fuse hole 133f may function as a fuse, thereby improving the safety of the rechargeable battery 200. In addition, if a region of the first fuse hole 123f or the second fuse hole 133f is melted in order to perform a fuse function, the rechargeable battery 200 may be provided with a gas discharge path Dg, as shown in FIG. 3, in addition to the vent plate 256, thereby facilitating gas discharge from the case 140.

As described above, if the rechargeable battery 200 includes the first and second short-circuit plates 258 and 259, the safety of the rechargeable battery 200 may be further improved against an overcharge or an internal short circuit while improving the safety against an external short circuit or an external shock, like the rechargeable battery 100 according to the embodiment illustrated in FIGS. 1A and 1B.

By way of summary and review, a primary battery may not be rechargeable and a secondary battery may be rechargeable (i.e., may be repeatedly charged and discharged). Rechargeable batteries may be classified into different types, for example, cylindrical and prismatic batteries. A rechargeable battery may be manufactured, e.g., by forming an electrode assembly including a positive electrode plate and a negative electrode plate and a separator interposed as an insulator therebetween, accommodating the electrode assembly with an electrolyte in a case and installing a cap plate in the case. A positive electrode terminal and a negative electrode terminal may be connected to the electrode assembly and may be exposed or protrude to the outside through the cap plate.

A rechargeable battery may include a fuse hole region to protect against short circuit conditions and large amounts of current. However, the fuse hole region may be damaged by relatively minor external shock, and this may prevent the fuse from functioning properly, which may create an increased safety risk.

In contrast, the rechargeable battery according to embodiments may include a fuse hole within an electrode terminal, and thus may substantially prevent a fuse hole region from being damaged due to a minor external shock, thereby substantially preventing a fuse function from degrading and substantially improving the safety of the rechargeable battery. Additionally, a rechargeable battery according to embodiments may include an internal hole provided within the electrode terminal, and thus a gas discharge path may be formed when a connection terminal is melted in order to implement the fuse function, thereby further improving the safety of the rechargeable battery. Also, a rechargeable battery according to an embodiment may have the fuse hole positioned outside the case, and thus gases may be substantially prevented from being generated from the electrolyte due to an arc (e.g., if a fuse region formed in the case is melted in order to implement a fuse function), which may further improve the safety of the rechargeable battery. As such, the embodiments disclosed herein represent an advance in the art.

Example embodiments have been disclosed herein, and although specific terms are employed, they are used and are to be interpreted in a generic and descriptive sense only and not for purpose of limitation. In some instances, as would be apparent to one of skill in the art as of the filing of the present application, features, characteristics, and/or elements described in connection with a particular embodiment may be used singly or in combination with features, characteristics, and/or elements described in connection with other embodiments unless otherwise specifically indicated. Accordingly, it will be understood by those of skill in the art that various changes in form and details may be made without departing from the spirit and scope of the present invention as set forth in the following claims.

What is claimed is:

1. A rechargeable battery, comprising:
an electrode assembly having a first electrode plate, a second electrode plate, and a separator;
a first terminal electrically connected to the first electrode plate;
a case accommodating the electrode assembly and the first terminal; and
a cap assembly sealing the case, wherein the first terminal includes:
a first collector plate electrically connected to the first electrode plate of the electrode assembly and accommodated in the case,
a first electrode terminal exposed to a top surface of the cap assembly, the first electrode terminal having a first terminal hole passing through a top surface and a bottom surface of the first electrode terminal, and
a first connection terminal having a first side electrically connected to the first electrode terminal and a second side electrically connected to the first collector plate, the first connection terminal having a fuse region including at least one first fuse hole, wherein the fuse region including the at least one first fuse hole is to melt when a predetermined current flows through first connection terminal, the first electrode terminal to be disconnected from the first collector plate when the fuse region melts.

2. The rechargeable battery as claimed in claim 1, wherein the first side of the first connection terminal having the at least one first fuse hole is mounted within the first terminal hole.

3. The rechargeable battery as claimed in claim 1, wherein the first connection terminal has a shape of a cylinder or a polygonal pillar with a shape of a circular or a polygonal ring in a horizontal section.

4. The rechargeable battery as claimed in claim 1, wherein the first connection terminal has a blocking plate with a shape of a pillar, and the blocking plate blocks an internal hole passing through top and bottom surfaces of the first connection terminal.

5. The rechargeable battery as claimed in claim 4, wherein the first connection terminal includes:
a first flange outwardly bent and extending from the first side of the first connection terminal, the first flange having a shape of a polygon or a circle in a horizontal section;
a second flange outwardly bent and extending from the second side of the first connection terminal, the second flange having a shape of a polygon or a circle in a horizontal section; and
a body connecting the first flange and the second flange.

6. The rechargeable battery as claimed in claim 5, wherein the second side of the first connection terminal is mounted in a first connection hole in the first collector plate.

7. The rechargeable battery as claimed in claim 5, wherein the blocking plate is positioned above the second flange and below the first fuse hole.

8. The rechargeable battery as claimed in claim 5, wherein the first electrode terminal has a ring shape with the terminal hole passing through the top and bottom surfaces thereof, and a top end perimeter of the terminal hole is greater than a bottom end perimeter of the terminal hole.

9. The rechargeable battery as claimed in claim 8, wherein the first electrode terminal further includes a first terminal protrusion horizontally protruding from a lower portion of the first electrode terminal.

10. The rechargeable battery as claimed in claim 9, wherein the first flange contacts a top surface of the first terminal protrusion and is fixed thereto.

11. The rechargeable battery as claimed in claim 6, wherein the first collector plate has a first region electrically connected to the first electrode plate, and a second region that is bent and extends from the first region and is electrically connected to the first connection terminal mounted in the first connection hole.

12. The rechargeable battery as claimed in claim 11, wherein the second region of the first collector plate is parallel with the cap assembly.

13. The rechargeable battery as claimed in claim 12, wherein the first connection hole passes through top and bottom surfaces of the second region of the first collector plate, and a top end perimeter of the first connection hole is smaller than a bottom end perimeter of the first connection hole.

14. The rechargeable battery as claimed in claim 12, wherein the second region of the first collector plate further includes a first collector plate protrusion horizontally protruding from an upper portion of the second region of the first collector plate.

15. The rechargeable battery as claimed in claim 14, wherein the second flange contacts a bottom surface of the first collector plate protrusion and is fixed thereto.

16. The rechargeable battery as claimed in claim 5, wherein the at least one first fuse hole is on a side of the body connected to the first flange.

17. The rechargeable battery as claimed in claim 1, wherein the at least one first fuse hole includes at least two first fuse holes spaced a predetermined distance apart from each other in a horizontal direction.

18. The rechargeable battery as claimed in claim 1, wherein the cap assembly includes:
   a cap plate sealing the case; and
   a vent plate in the cap plate, the vent plate to open when an internal pressure of the case exceeds a preset pressure.

19. The rechargeable battery as claimed in claim 18, further comprising:
   a second terminal electrically connected to the second electrode plate;
   a first short-circuit plate in a short-circuit hole in the cap plate and electrically connected to the cap plate, the first short-circuit plate forming an upward convex protrusion when the internal pressure of the case exceeds a predetermined pressure; and
   a second short-circuit plate upwardly spaced apart from the first short-circuit plate and electrically connected to the second terminal.

20. The rechargeable battery as claimed in claim 1, wherein:
   the first side of the first connection terminal includes a fuse region,
   the fuse region to melt to form a gas discharge path when an applied current reaches a predetermined amount, and
   the gas discharge path allows gas within the case to discharge to outside of the case through the first terminal hole.

* * * * *